C. W. HOTTMANN, Jr.
DOUGH MIXING MACHINE.
APPLICATION FILED OCT. 23, 1914.

1,179,922. Patented Apr. 18, 1916.

WITNESSES
L. Rouville,
D. F. Nagle.

INVENTOR
Charles W. Hottmann, Jr.
BY Niedersheim Fairbanks
ATTORNEYS

C. W. HOTTMANN, Jr.
DOUGH MIXING MACHINE.
APPLICATION FILED OCT. 23, 1914.
1,179,922.
Patented Apr. 18, 1916.
2 SHEETS—SHEET 2.
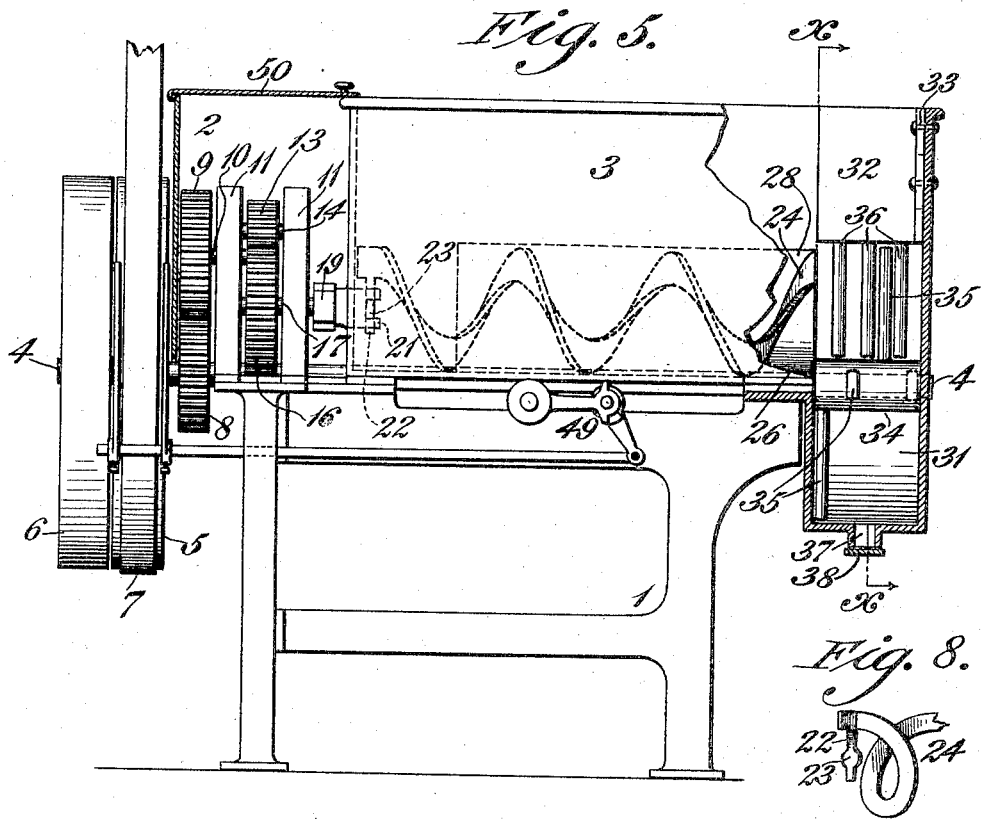
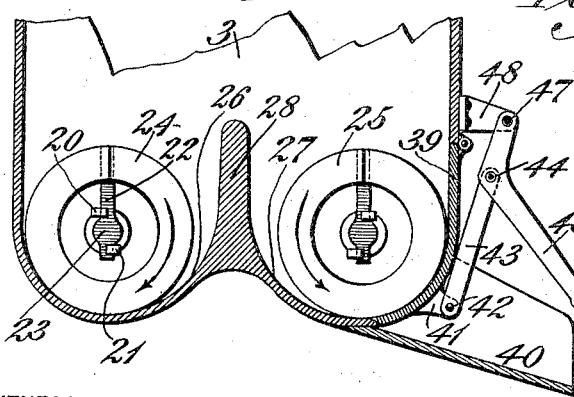
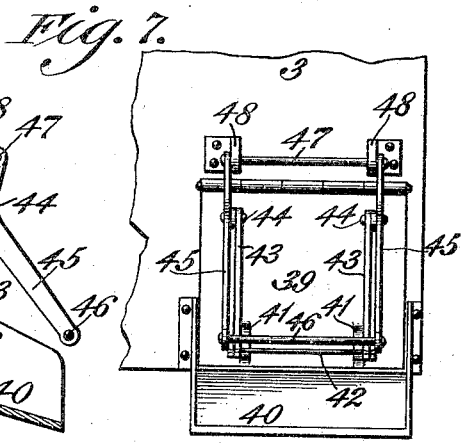
WITNESSES
INVENTOR
Charles W. Hottmann Jr.
BY
ATTORNEYS

UNITED STATES PATENT OFFICE.

CHARLES W. HOTTMANN, JR., OF PHILADELPHIA, PENNSYLVANIA, ASSIGNOR TO THE HOTTMANN & JUERGENS MACHINE CO., A FIRM COMPOSED OF CHARLES W. HOTTMANN AND AUGUST JUERGENS, OF PHILADELPHIA, PENNSYLVANIA.

DOUGH-MIXING MACHINE.

1,179,922.  Specification of Letters Patent.  Patented Apr. 18, 1916.

Application filed October 23, 1914.  Serial No. 868,182.

*To all whom it may concern:*

Be it known that I, CHARLES W. HOTTMANN, Jr., a citizen of the United States, residing in the city and county of Philadelphia, State of Pennsylvania, have invented a new and useful Dough-Mixing Machine, of which the following is a specification.

My invention relates to a machine which is especially adapted for the mixing of dough.

The invention consists of novel mechanism for feeding, mixing and kneading the dough and controlling its discharge from the machine.

Other novel features and advantages of my invention will hereinafter appear in the detailed description.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1:
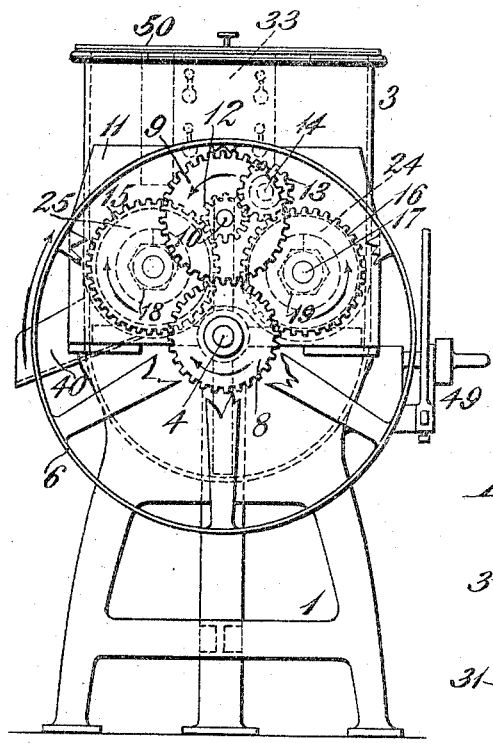
Figure 2:
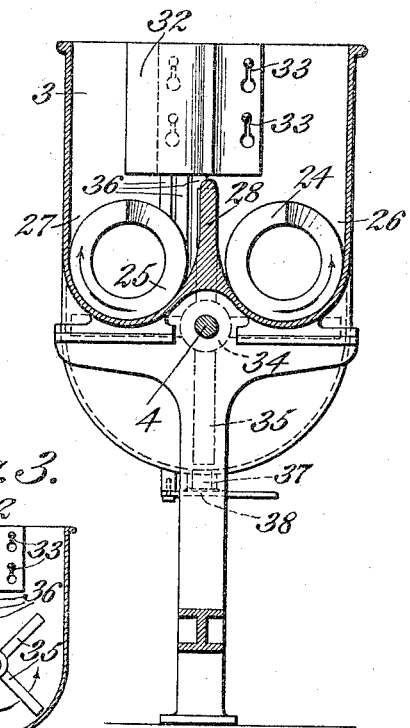
Figure 3:
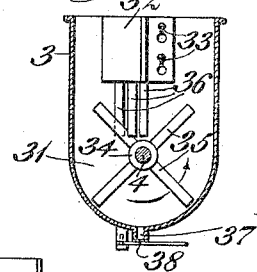
Figure 4:
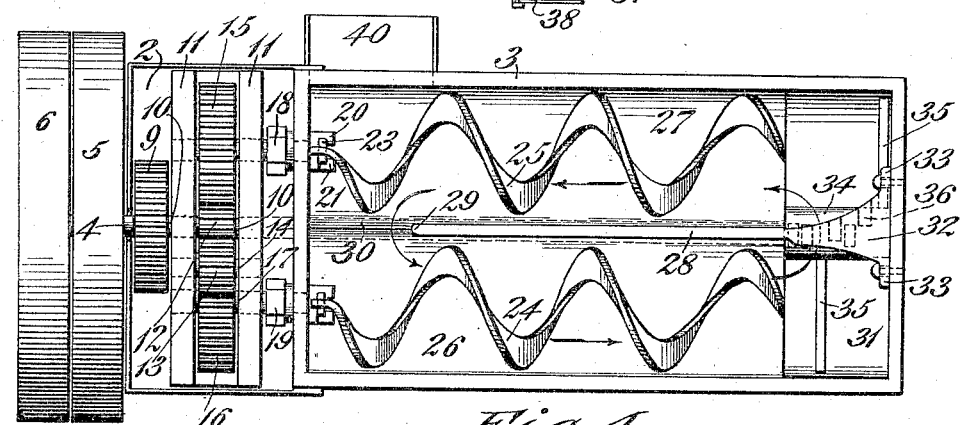

Figure 1 represents an end elevation of a dough mixing machine embodying my invention. Fig. 2 represents a sectional view thereof. Fig. 3 represents a sectional view on line *x—x* of Fig. 5. Fig. 4 represents a plan view of the machine. Fig. 5 represents a side elevation partly in section of the machine. Fig. 6 represents a transverse section of the machine. Fig. 7 represents a side elevation of a portion of the machine. Fig. 8 represents a perspective view of one end of a conveyer.

Similar numerals of reference indicate corresponding parts in the figures.

Referring to the drawings:—1 designates the framework of a dough mixing machine embodying my invention. Supported on the framework is the gear casing 2 and the casing or container 3 for the material which is to be treated.

4 designates a driving shaft, on which are mounted a fast and a loose pulley 5 and 6, respectively, whereby the shaft 4 may be driven by means of a belt 7 which is actuated by any desired source of power. The shaft 4 has mounted thereon a gear 8, which meshes with a gear 9 mounted on a shaft 10 which is journaled in standards 11 within the gear casing 2. The shaft 10 has mounted thereon a pinion 12 which meshes with a gear 13 mounted on a shaft 14, and said pinion 12 also meshes with a pinion 15; said gear 13 meshing with a gear 16 mounted on a shaft 17. The shaft on which the pinion 15 is mounted and the shaft 17 are journaled in the standards 11 and are each provided with a coupling 18 and 19, respectively, each of which is of similar construction, and I have therefore described but one of these in detail. The coupling member 18, for example, extends through the end wall of the dough container 3, as will be understood by reference to Figs. 4, 5 and 6, and its inner end forms two hook like members 20 and 21, respectively, between which is adapted to pass a locking bar 22, which is provided with an enlargement 23, intermediate its end, in order to limit the downward movement of said bar with respect to the hooks 20 and 21. The bar 22 is connected with its respective conveyer and mixing member 24 or 25, it being noted that two of these are employed which rotate within their respective channels 26 and 27, which are formed by the casing or container 3 and the intermediate plate or diaphragm 28, which latter terminates at 29 to form a passageway 30 communicating with the channels 26 and 27 at their inner ends. The portion of the casing which forms the bottom of the channels is preferably rounded, as will be understood by reference to Fig. 6.

The conveyer and feeder members 24 and 25 comprise each a flat bar material in the form of a spiral, the free ends of which terminate in proximity to the kneading chamber 31, with which the feed channels 26 and 27 are in direct communication. Said channels are separated from each other at their forward ends in the upper portion of the chamber 31 by means of a guide block 32, which is removably connected with the end wall of the casing 3 by means of fastening devices 33 of any desired type. Opposite sides of this guide block 32 are preferably curved inwardly toward the diaphragm or rib 28, as will be best understood by reference to Fig. 4. The shaft 4 does not extend through the dough container 3 but extends beneath the same and passes into the kneading chamber 31, in order to receive the hub 34, which carries the kneading blades 35, which are arranged in staggered relation on said hub, it being seen from Fig. 5, that they are spaced both laterally and circumferentially from each other. The block 32 carries the stationary kneading blades 36 which are laterally spaced from each other and from the sides of the kneading chamber 31, so that a space is formed, through which the respective rotatable kneading blade may pass. The bottom of the kneading chamber 31 is provided with a drainage port 37 which is normally maintained in a sealed condition by means of a pivoted closure 38.

In order to provide for the proper discharge of the dough or other material which has been mixed, one of the feed channels, such as, for example, the feed channel 27, is provided with an opening controlled by a pivoted closure 39, whereby the discharge of material to the discharge spout 40 may be regulated, as desired. The closure 39 has connected therewith the brackets 41 which carry the rod 42 which latter passes through the links 43, said links being connected by means of pins 44 with the lever arms 45, the lower ends of which are connected by a rod 46. The opposite ends of the levers 45 are connected by the rod 47, which is mounted in brackets 48 secured to the casing 3 in any desired manner.

49 designates the belt shifting mechanism.

The operation of my novel dough mixing machine will now be readily apparent to those skilled in this art and is as follows: The material which is to be mixed, such as for example, the ingredients of the dough, are placed in the dough container 3 and the conveyers 24 and 25 are rotated in the direction of the arrow seen in Fig. 1. The material is fed from the feed channel 27 to the rear of the machine and then passes through the passes 30 into the feed channel 26, in which it is fed forwardly into the kneading chamber 31. The kneading blades 35 are forced through the material and causes the material, as the dough, to pass between the rotatable and stationary kneading blades 36 and 35, respectively, and the dough is again fed into the feed channel 27 where it is mixed and conveyed through the same cycle of operation as that just described, until the dough has reached the proper consistency. When the dough is to be discharged in the machine, the rod 46 is manually actuated to open the closure 39, whereupon the dough is automatically fed into the discharge spout 40.

Attention is directed to the manner of removably connecting the spiral conveyers, whereby they may be readily removed when it is desired to clean the machine.

It will be seen that the gear mechanism is inclosed within a gear casing or container 2 and the removable cover 50 is provided, whereby injury to the operator by coming into contact with the gears is positively prevented. Any desired mechanism may be employed for locking the closure 39.

It will now be apparent that I have devised a novel and useful dough mixing machine, which embodies the features of advantage enumerated as desirable in the statement of the invention and the above description, and while I have, in the present instance, shown and described a preferred embodiment thereof which will give in practice satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. A machine of the character stated, comprising a casing having feed channels arranged side by side therein and a kneading chamber communicating with one end of said feed channels, stationary kneading blades extending into said kneading chamber, movable kneader blades rotatably mounted in said chamber to travel in proximity to said stationary kneading blades, feed conveyers in said channels, and constructed to feed the materials to and from said kneading chamber and means to actuate said feed conveyers and said rotatable blades.

2. A machine of the character stated, comprising a casing having feed channels arranged side by side therein and communicating with each other at their inner ends, said casing having a kneading chamber communicating with said feed channels at their other ends, kneading mechanism within said kneading chamber, means to cause a circulation of the material through said feed channels and to and from said kneading chamber, and devices for actuating said kneading mechanism.

3. A machine of the character stated, comprising a casing having feed channels arranged side by side therein and a kneading chamber communicating with said channels, stationary kneading blades in said kneading chamber, rotatable kneading blades in said chamber, conveyers in said feed channels, one of said channels having its bottom forming at its inner end a discharge spout and having a delivery opening registering with said spout, a closure for said opening, and means to actuate said conveyers and said rotatable kneading blades.

4. A machine of the character stated, comprising a casing having a kneading chamber at one end thereof and channels extending rearwardly from said chamber and communicating with each other at their rear ends only, a conveyer for each of said channels, one of said conveyers being arranged to feed the material into said kneading chamber and the other of said conveyers being arranged to feed the material from said kneading chamber, means to actuate said conveyers to cause the material being treated to pass to and from said kneading chamber, kneading blades within said kneading chamber, actuating means for said kneading blades, and means to prevent the material passing through said kneading chamber without being acted upon by said kneading blades.

5. A machine of the character stated, comprising a casing having its bottom contributing to form with an upwardly extending rib, two feed channels, said rib terminating at a distance from the rear end of said casing to provide a communication between said feed channels, a spiral conveyer in each of said feed channels, a driving shaft exteriorly of said casing and operatively connected with said conveyers to drive the same, said casing having a kneading chamber communicating with said feed channels and into which said shaft extends, a hub on said shaft, kneading blades spaced laterally and circumferentially on said hub, laterally spaced stationary blades extending into said kneading chamber, and means for supporting said stationary blades.

6. A machine of the character stated, comprising a casing having a chamber at one end thereof and separate feed channels extending rearwardly from said chamber and communicating with each other at their rear ends, coupling members having hooks extending into said feed channels, a spiral conveyer for each feed channel and provided with a locking bar to interlock with the hooks of its respective coupling, means to simultaneously rotate said conveyer, and kneading mechanism within said chamber.

7. A machine of the character stated, comprising a gear casing and a casing for the material to be treated, said latter casing having a chamber at one end thereof and parallelly arranged feed channels communicating with said chamber at one end and with each other at the other end, stationary and movable kneading blades within said chamber, conveyer members removably mounted within said feed channels, one of said conveyer members being adapted to feed the material into said chamber and the other of said conveyer members being adapted to feed the material from said chamber, and actuating means for said conveyer members and said movable blades, and including gear mechanism mounted in said gear casing.

8. A machine of the character stated, comprising a casing having a kneading chamber at one end thereof and a plurality of parallelly arranged feed channels communicating at one end with said chamber and at the other end with each other, a guide block in said chamber, laterally spaced blades carried by said guide block, laterally and circumferentially spaced kneading blades rotatably mounted within said chamber and arranged to travel in proximity to the blades of said guide block, means to actuate said rotatably mounted blades, and means to effect the circulation of the material being treated through said feed channels and to and from said chamber.

9. A machine of the character stated, comprising a casing having a kneading chamber at one end and having a centrally located rib extending from said casing and contributing to form two feed channels which communicate with each other at their inner ends only, a feed conveyer in one of said channels arranged to feed the material into said kneading chamber, a feed conveyer in the other of said channels arranged to feed the material from said kneading chamber, kneading devices in said kneading chamber and arranged to receive the material from one feed channel and to discharge it into the other feed channel, and means to actuate said feed conveyers and said kneading devices.

CHARLES W. HOTTMANN, Jr.

Witnesses:
H. S. FAIRBANKS,
C. D. McVAY.

Copies of this patent may be obtained for five cents each, by addressing the "Commissioner of Patents, Washington, D. C."